United States
Nakamura

4,155,629
May 22, 1979

[54] WIDE ANGLE ZOOM LENS SYSTEM

[75] Inventor: Soichi Nakamura, Kamakura, Japan

[73] Assignee: Nippon Kogaku K.K., Tokyo, Japan

[21] Appl. No.: 793,760

[22] Filed: May 4, 1977

[30] Foreign Application Priority Data

May 8, 1976 [JP] Japan .................. 51-691

[51] Int. Cl.² ................................. G02B 15/16
[52] U.S. Cl. ...................................... 350/184
[58] Field of Search ................. 350/184–187

[56] References Cited

U.S. PATENT DOCUMENTS 4,074,931  2/1978  Okudaira ...................... 350/184

FOREIGN PATENT DOCUMENTS 2637668  3/1977  Fed. Rep. of Germany ........... 350/184

*Primary Examiner*—Conrad J. Clark
*Attorney, Agent, or Firm*—Shapiro and Shapiro

[57] ABSTRACT

In a wide angle zoom lens system which comprises a diverging lens group and a converging lens group in order from the object side and in which both of the groups are movable on the optical axis of the lens system to vary the air space between the two groups so that the magnification of the image is variable while the image plane is being maintained at a fixed position, the diverging lens group comprises, in order from the object side, a negative meniscus lens component convex to the object side, a negative meniscus lens component convex to the object side, and a positive meniscus lens component convex to the object side, and the converging lens group comprises at least four positive lens components which are separate from one another, a positive lens component being closest to the object side, a positive lens compartment being closest to the image and a negative lens component disposed among the at least four positive lens components.

12 Claims, 6 Drawing Figures

SPHERICAL ABERRATION ——
DEVIATION FROM ---- 
THE SINE CONDITION

| Spherical Aberration | Astigmatism | Distortion |
|---|---|---| f=36.023, F3.5, 30.9°, 30.9°, -1.0 to 1.0, -5 to 5% f=49.497, F3.5, 23.575°, 23.575° f=68.795, F3.5, 17.43°, 17.43°

WIDE ANGLE ZOOM LENS SYSTEM

BACKGROUND OF THE INVENTION

1. Field of the Invention

This invention relates to a zoom lens system, and more particularly to a zoom lens system covering a wide angle of view.

2. Description of the Prior Art

As a zoom lens system covering a wide angle of view, there is known a zoom lens system which comprises two forward and rearward lens groups, namely, a diverging lens group and a converging lens group, but such zoom lens system suffers from various difficulties still left to be generally overcome, such as the destruction of the balance of spherical aberration and coma attributable to the variation in focal length, the pronounced negative distortion at the short focal length side, the variation in distortion during the focal length condition at the opposite ends of zooming, the imbalance of the chromatic aberration of magnification attributable to the angle of view, the mismatching of the curvature of image field attributable to chromatic difference, and the difficulty encountered in reducing the size of the forward lens diameter to make the entire system more compact. These difficulties come from the fact that the forward group is a diverging lens system, and some attempts to overcome these disadvantages have heretofore been made by the use of various diverging lens systems. For example, to overcome the problem concerning the correction of distortion, there is a method which uses a positive meniscus lens convex to the object side as a first component forming the diverging lens group, or a method which uses a negative meniscus lens convex to the object side as the first component. However, any of these involves a considerably great thickness for the diverging lens group which is the forward group, so that the front principal point of the diverging group has come deeply toward the image side, which has unavoidably led to an increase in the forward lens diameter.

SUMMARY OF THE INVENTION

The present invention has, for its object, to overcome the above-noted disadvantages and to provide a zoom lens system which comprises two lens group, namely, a diverging lens group and a converging lens group and which is constructed simply in a manner described hereinafter. The diverging lens group which is the forward group comprises, in the order from the object side, a first member which is a negative meniscus lens component convex to the object side, a second member which is a negative meniscus lens component convex to the object side, and a third member which is a positive meniscus lens component convex to the object side, these three components being separate from one another, and the converging lens group which is the rearward group comprises a lens arrangement as will hereinafter be described, thereby realizing a zoom optical system which covers an angle of view of the order of 62° at the short focal length side of the system and in which the forward lens diameter may be reduced.

The invention will become more fully apparent from the following detailed description thereof taken in conjunction with the accompanying drawings.

BRIEF DESCRIPTION TO THE DRAWINGS

Figure 4:
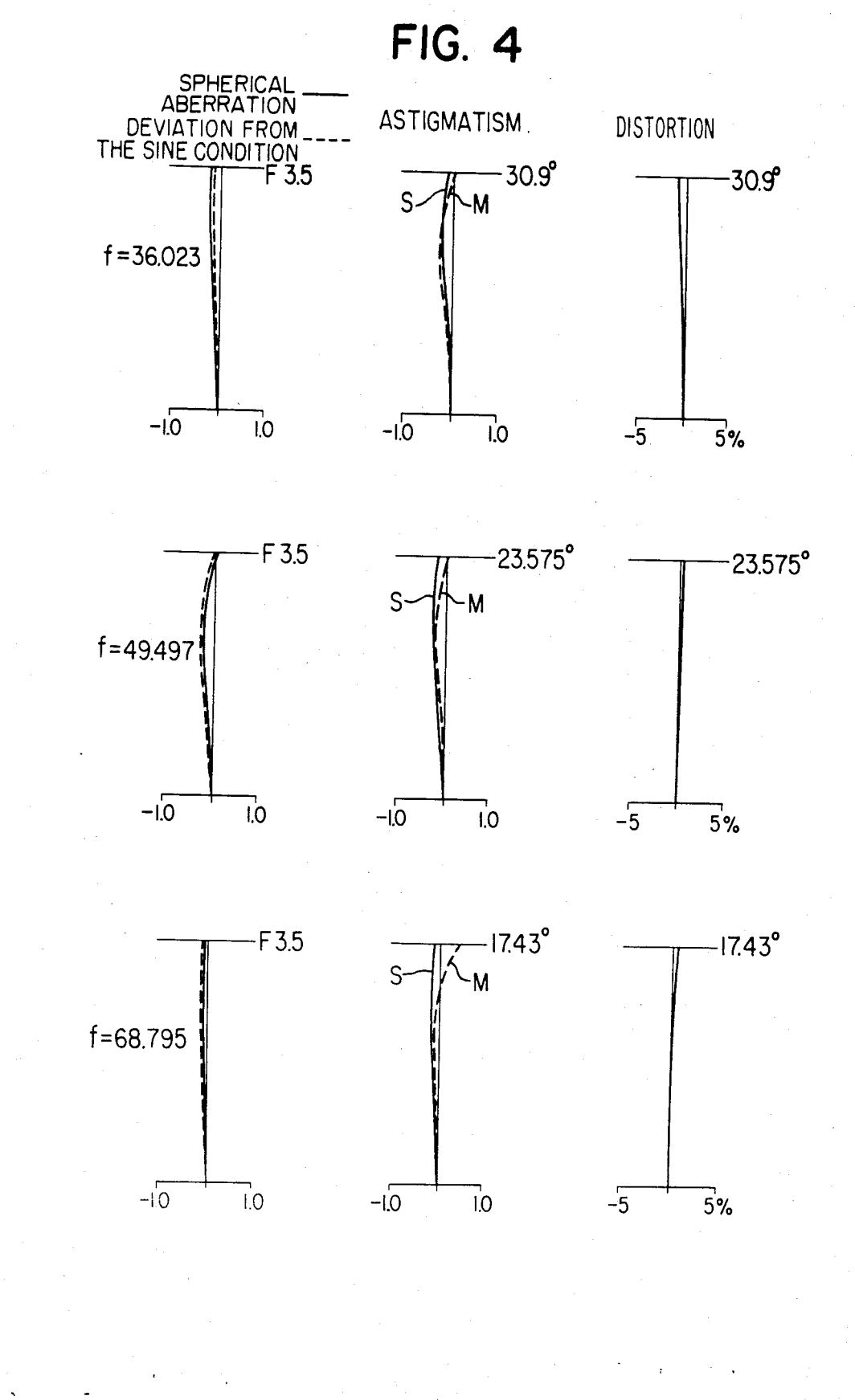

FIG. 4 illustrates aberrations in Example 1.

FIG. 6 illustrates aberrations in Example 3.

DESCRIPTION OF THE PREFERRED EMBODIMENTS

Figure 1:
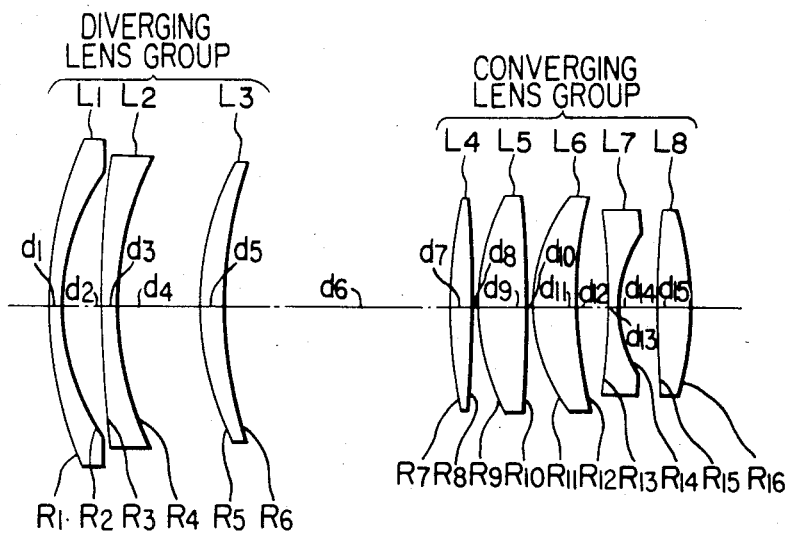
FIG. 1 shows the lens arrangement according to Example 1 of the present invention.
Figure 2:
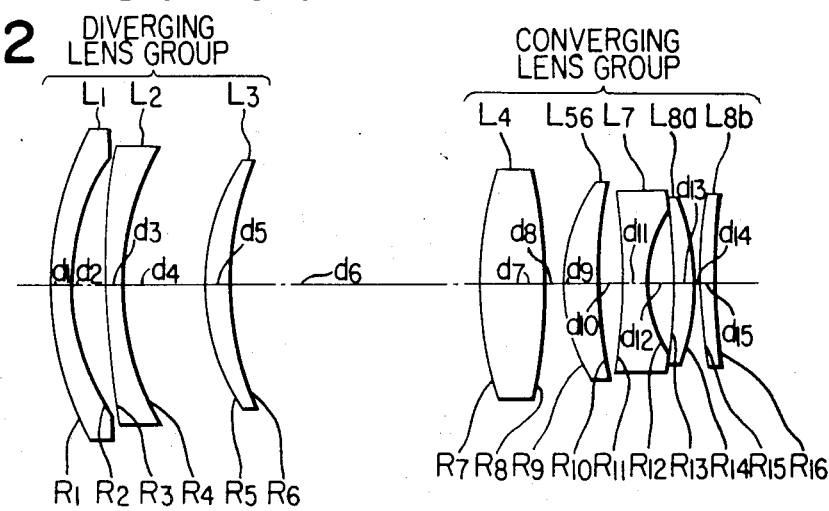
FIG. 2 shows the lens arrangement according to Example 2 of the present invention.
Figure 3:
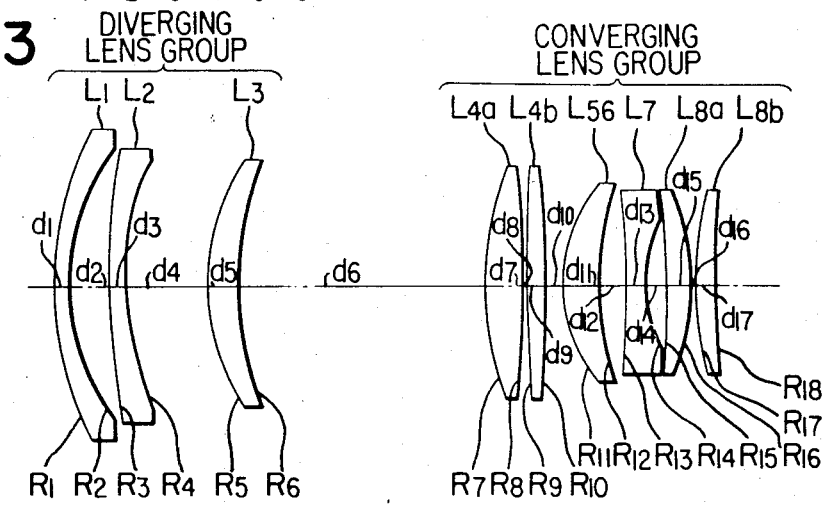
FIG. 3 shows the lens arrangement according to Example 3 of the present invention.
Figure 5:
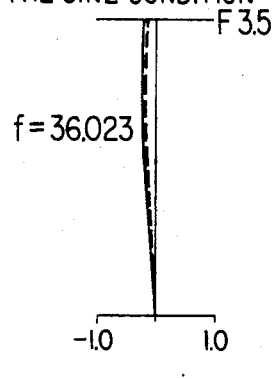
FIG. 5 illustrates aberrations in Example 2.
Figure 5:
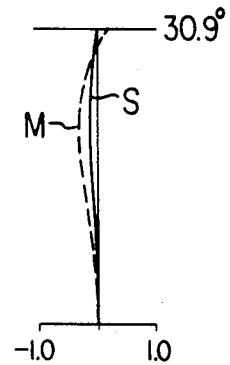
Figure 5:
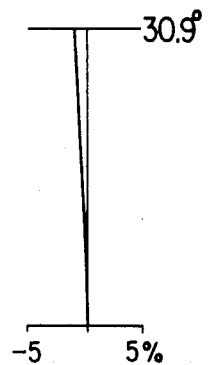
Figure 5:
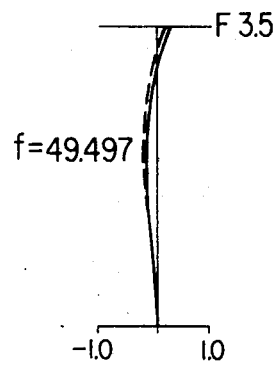
Figure 5:
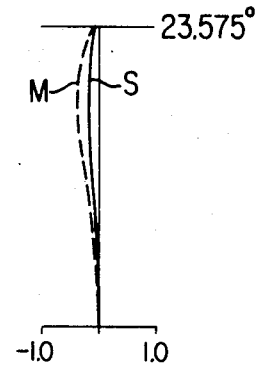
Figure 5:
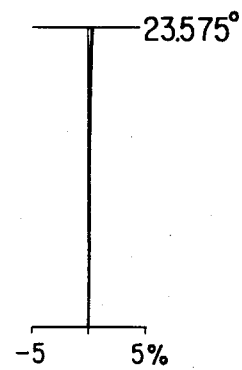
Figure 5:
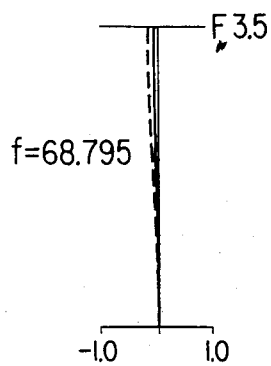
Figure 5:
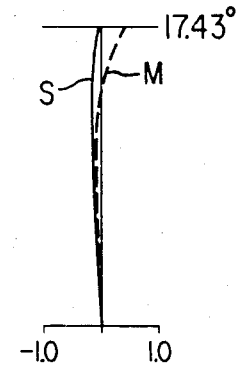
Figure 5:
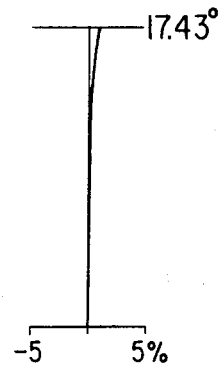

The construction of the above-described diverging lens group will first be considered in detail. This diverging lens group must satisfy the condition:

$$0.1 < D/|f_1| < 0.25 \quad (1)$$

where $f_1$ represents the total focal length of the diverging lens group, and D the air space between the second member or the negative lens component $L_2$ and the third member or the positive meniscus lens component $L_3$. This condition forms the greatest feature of the zoom lens system according to the present invention, and by this condition, it is possible to correct the spherical aberration at the opposite ends of the focal length and the variation in curvature of image field. If the upper limit of this condition is exceeded, the diverging lens groups will become to thick so that the back principal plane of the diverging lens group will shift toward the object side and thus, no zoom ratio may be secured. If the lower limit is exceeded, it will become difficult to correct the variation in spherical aberration and the variation in curvature of image field at a time.

It is also desirable that the following conditions be satisfied:

$$|f_1| < |f_{11}| < 2|f_1| \quad (2),$$

$$|f_1| < |f_{12}| < 2|f_1| \quad (3),$$

$$1.5|f_1| < |f_{13}| < 3.0|f_1| \quad (4) \text{ and}$$

$$1.0 < \frac{R_3 + R_4}{R_3 - R_4} < \frac{R_1 + R_2}{R_1 - R_2} < \left|\frac{R_5 + R_6}{R_5 - R_6}\right| \quad (5),$$

where $f_{11}$, $f_{12}$, and $f_{13}$ represent the focal lengths of the three components forming the diverging lens group, in the order from the object side, and $R_1$, $R_2$, $R_3$, $R_4$, $R_5$ and $R_6$ represent the curvature radii of the successive refracting surfaces of these components. Conditions (2), (3) and (4) are concerned with the power distributions to be assumed by the three components in the diverging lens group which is the forward group, condition (5) is concerned with the bending of each component, and by these conditions being satisfied, it is possible to construct a forward group or a diverging lens group for a compact optical system in which distortion may be reduced.

Significances of these conditions will be now described in detail. If the lower limits of conditions (2) and (3) are exceeded, the negative power in the forward group or the diverging lens group will be concentrated upon the front portion of this group to excessively intensify the positive power disposed in the last place to negate said negative power, and this will offer an inconvenience to the correction of the spherical aberration, especially at the longest focal length side and also cause the back principal plane of the entire diverging group to shift toward the object side, thus imposing a corresponding limitation on the amounts of zooming movement of the forward group or the diverging lens group and the rearward group or the converging lens group, so that the zoom ratio may be reduced. On the other hand, if the upper limits of conditions (2) and (3) are exceeded, the negative power in the front portion of the diverging lens group will be smaller and correspondingly, the position of entrance of the oblique rays will become distant from the optical axis, and this will lead to sharp enlargement of the forward lens diameter. Also, the positive power itself of the third component will unavoidably become weaker and this will offer an inconvenience in realizing the achromatization of the entire diverging lens group. Condition (4) is closely correlated with condition (1) and, if the lower limit of condition (4) is exceeded, the power of the third member in the diverging lens group which is a positive meniscus lens convex to the object side will be too great so that high degrees of spherical aberration will occur at the long focal length side to make it difficult to balance the aberrations. Also, if the upper limit of condition (4) is exceeded, it will be difficult to achieve achromatization of the entire diverging lens group during the correction of the chromatic aberration in the zoom lens of this type and at the same time, the effect of condition (1) will be decreased. Condition (5) is a preferred one for minimizing the occurrence of distortion when the power arrangement as specified by conditions (2), (3) and (4) is adopted, and it is desirable for both of the first and the second member that their shape factors $(R_i + R_{i+1})/(R_i - R_{i+1})$ be greater than 1.0, that the shape factor of the first member be greater than that of the second member and that the absolute value of the shape factor of the third member be greater than those of the first and second members.

Since the diverging lens group comprises three members, it is desirable that the following conditions be satisfied in order to make each of the members work as effectively as possible:

$\nu_1 > \nu_3$ and $\nu_2 > \nu_3$, where $\nu_1$ represents the Abbe number of the first member or the negative meniscus lens component $L_1$, $\nu_2$ the Abbe number of the second member or the negative lens component $L_2$, and $\nu_3$ the Abbe number of the third member or the positive meniscus lens component $L_3$. Unless these conditions are satisfied, achromatization of the entire diverging lens group will not be sufficient and this will necessitate at least one desired component to be formed as a doublet.

The converging lens group which is the rearward group will now be described. It is already known that this group must be of a great aperture since it is preceded by the diverging group, but when designing a zoom lens of this type as compact as possible, it is desirable that a construction approximate to that of the telephoto type be adopted, namely, the principal plane lie as forwardly as possible. When further compactness is desired, it is necessary to intensify the powers of both the diverging lens group and the converging lens groups, and it is required that the resulting increase of the Petzval sum toward the negative direction can be sufficiently corrected.

For the reasons set forth above, firstly, the present invention employs a five-component converging lens group approximate in construction to the Sonnar type to thereby expedite the possibility of compactness. Secondly, the converging lens group is formed by a power arrangement of positive, positive, negative, positive and positive in the order from the object side for the purpose of further reducing the forward lens diameter, thereby making it possible to bring the diaphragm more to the front (Examples 2 and 3). Since, in this construction, the Petzval sum essentially tends to become positive, the positive components need not be reduced in refractive index and thus, the curvature radii can be selected to relatively great values and this enables considerably great aperture to be provided simply by disposing two positive lens components forwardly of the negative lens component as in the Sonnar type. Further, by a positive meniscus lens convex to the image side being disposed rearwardly of the negative lens component, a great curvature radius can be provided for the rearward surface of the negative lens component and, as compared with the Sonnar type, this enables oblique rays to pass through positions distant from the optical axis. Accordingly, it is possible to bring the diaphragm more to the front to thereby contribute to the compactness of the entire optical system.

By using any of the above-described two types of converging lens group in addition to the three-component diverging lens group as previously described, the basic form of the wide angle zoom lens system of the present invention which comprises two groups has been achieved. In such construction, the respective lens components in the diverging lens group should desirably take the shapes as represented by the following shape factors, and the various aberrations can thus be corrected with ease.

$$3.3 < \frac{R_1 + R_2}{R_1 - R_2} < 4.2,$$
$$1.5 < \frac{R_3 + R_4}{R_3 - R_4} < 2.3 \text{ and}$$
$$-8.0 < \frac{R_5 + R_6}{R_5 - R_6} < -4.8,$$

where $R_1, R_2, \ldots$, respectively represent the curvature radii of the successive refracting surfaces of the lens components in the diverging lens group, as viewed from the object side.

In the manner described above, a wide angle zoom lens system is provided which is simple in construction and small in entire shape and in which various aberrations are comparable to those in the fixed focal length lens and especially, distortion is very well corrected. In terms of performance, this lens system covers an angle of view of 61.8° during its shortest focal length condition, a zoom ratio of about 2.0 and F-number 3.5.

Preferred examples of the present invention will hereinafter be described.

Example 1 is a form in which the converging lens group adopts the Sonnar type power arrangement of positive $L_4$, positive $L_5$, positive $L_6$, negative $L_7$ and positive $L_8$ and it is seen that this Example maintains very good aberration balance during any focal length condition.

Example 2 is a form in which the converging lens group adopts the power arrangement of positive $L_4$, positive $L_{56}$, negative $L_7$, positive $L_{8a}$ and positive $L_{8b}$ and it is seen that this Example maintains very good aberration balance during any focal length condition.

Example 3 is a form in which the converging lens group comprises six lens components but which is substantially equivalent to Example 2, and it is seen that this Example also maintains good aberration balance.

Any of these Examples is characterized in that distortion is particularly well corrected, and it will be apparent that correction of high degrees of chromatic aberration may become possible by making each lens component into a doublet component.

Numerical data in the various Examples will be shown below. In the examples below, R, d, n and $\nu$ respectively represent the curvature radii of the refractive surfaces, the center thicknesses of and the air spaces between the respective lens components, the refractive indices for d-line (wavelength $\lambda=587.6$ nm), and the Abbe numbers for d-line.

EXAMPLE 1

Total focal length: 36.023-49.497-68.795
F-number: 3.5
Maximum angle of view: 61.8°
Back focal distance: 43.286-52.587-65.909
focal length of divergent group: $f_1 = -59.942$
focal length of convergent group: $f_2 = 41.379$

| | | | | |
|---|---|---|---|---|
| | $R_1 = 46.411$ | $d_1 = 1.5$ | $n_1 = 1.71300$ | $\nu_1 = 53.9$ |
| | $R_2 = 25.766$ | $d_2 = 6.1$ | | |
| $f_1$ | $R_3 = 136.271$ | $d_3 = 2.3$ | $n_2 = 1.69680$ | $\nu_2 = 55.6$ |
| | $R_4 = 37.166$ | $d_4 = 8.3$ | | |
| | $R_5 = 34.764$ | $d_5 = 3.8$ | $n_3 = 1.80518$ | $\nu_3 = 25.5$ |
| | $R_6 = 51.636$ | $d_6 = 33.561 - 14.818 - 0.761$ | | |
| | $R_7 = 86.016$ | $d_7 = 3.1$ | $n_4 = 1.46450$ | $\nu_4 = 65.8$ |
| | $R_8 = -426.543$ | $d_8 = 0.1$ | | |
| | $R_9 = 32.028$ | $d_9 = 5.3$ | $n_5 = 1.52000$ | $\nu_5 = 70.1$ |
| | $R_{10} = -365.381$ | $d_{10} = 0.1$ | | |
| | $R_{11} = 20.985$ | $d_{11} = 5.8$ | $n_6 = 1.52000$ | $\nu_6 = 70.1$ |
| $f_2$ | $R_{12} = 54.800$ | $d_{12} = 4.0$ | | |
| | $R_{13} = -229.491$ | $d_{13} = 1.5$ | $n_7 = 1.80518$ | $\nu_7 = 25.5$ |
| | $R_{14} = 18.432$ | $d_{14} = 4.5$ | | |
| | $R_{15} = 103.230$ | $d_{15} = 3.6$ | $n_8 = 1.67270$ | $\nu_8 = 32.2$ |
| | $R_{16} = -40.525$ | | | |

EXAMPLE 2

Total focal length: 36.023-49.497-68.795
F-number: 3.5
Maximum angle of view: 61.8°
Back focal distance: 42.763-52.064-65.385
focal length of divergent group: $f_1 = -59.942$
focal length of convergent group: $f_2 = 41.379$

| | | | | |
|---|---|---|---|---|
| | $R_1 = 43.640$ | $d_1 = 1.5$ | $n_1 = 1.71300$ | $\nu_1 = 53.9$ |
| | $R_2 = 25.862$ | $d_2 = 4.9$ | | |
| $f_1$ | $R_3 = 97.646$ | $d_3 = 2.3$ | $n_2 = 1.69680$ | $\nu_2 = 55.6$ |
| | $R_4 = 34.089$ | $d_4 = 10.7$ | | |
| | $R_5 = 32.807$ | $d_5 = 3.8$ | $n_3 = 1.80518$ | $\nu_3 = 25.5$ |
| | $R_6 = 43.313$ | $d_6 = 32.854 - 14.110 - 0.054$ | | |
| | $R_7 = 38.800$ | $d_7 = 8.6$ | $n_4 = 1.62041$ | $\nu_4 = 60.3$ |
| | $R_8 = -118.771$ | $d_8 = 2.5$ | | |
| | $R_9 = 21.150$ | $d_9 = 4.9$ | $n_5 = 1.62041$ | $\nu_5 = 60.3$ |
| | $R_{10} = 67.565$ | $d_{10} = 2.7$ | | |
| | $R_{11} = -111.186$ | $d_{11} = 4.2$ | $n_6 = 1.80518$ | $\nu_6 = 25.5$ |
| $f_2$ | $R_{12} = 20.265$ | $d_{12} = 3.0$ | | |
| | $R_{13} = -100.634$ | $d_{13} = 3.2$ | $n_7 = 1.62588$ | $\nu_7 = 35.6$ |
| | $R_{14} = -29.367$ | $d_{14} = 0.1$ | | |
| | $R_{15} = 50.024$ | $d_{15} = 2.5$ | $n_8 = 1.62588$ | $\nu_8 = 35.6$ |
| | $R_{16} = 110.281$ | | | |

EXAMPLE 3

Total focal length: 36.023-49.497-68.795
F-number: 3.5
Maximum angle of view: 61.8°
Back focal distance: 42.981-52.283-65.604
focal length of divergent group: $f_1 = -59.942$
focal length of convergent group: $f_2 = 41.379$

| | | | | |
|---|---|---|---|---|
| | $R_1 = 43.524$ | $d_1 = 1.5$ | $n_1 = 1.71300$ | $\nu_1 = 53.9$ |
| | $R_2 = 26.068$ | $d_2 = 4.9$ | | |
| $f_1$ | $R_3 = 98.490$ | $d_3 = 2.3$ | $n_2 = 1.69680$ | $\nu_2 = 55.6$ |
| | $R_4 = 34.319$ | $d_4 = 11.4$ | | |
| | $R_5 = 33.114$ | $d_5 = 3.8$ | $n_3 = 1.80518$ | $\nu_3 = 25.5$ |
| | $R_6 = 43.047$ | $d_6 = 32.883 - 14.140 - 0.083$ | | |
| | $R_7 = 38.412$ | $d_7 = 5.0$ | $n_4 = 1.62041$ | $\nu_4 = 60.3$ |
| | $R_8 = -273.441$ | $d_8 = 0.1$ | | |
| | $R_9 = 301.136$ | $d_9 = 2.4$ | $n_5 = 1.62041$ | $\nu_5 = 60.3$ |
| | $R_{10} = -777.160$ | $d_{10} = 2.5$ | | |
| | $R_{11} = 20.877$ | $d_{11} = 5.6$ | $n_6 = 1.62041$ | $\nu_6 = 60.3$ |
| $f_2$ | $R_{12} = 53.182$ | $d_{12} = 3.0$ | | |
| | $R_{13} = -125.912$ | $d_{13} = 2.5$ | $n_7 = 1.80518$ | $\nu_7 = 25.5$ |
| | $R_{14} = 20.055$ | $d_{14} = 2.9$ | | |
| | $R_{15} = -157.736$ | $d_{15} = 3.3$ | $n_8 = 1.62588$ | $\nu_8 = 35.6$ |
| | $R_{16} = -31.259$ | $d_{16} = 0.1$ | | |
| | $R_{17} = 58.587$ | $d_{17} = 2.5$ | $n_9 = 1.62588$ | $\nu_9 = 35.6$ |
| | $R_{18} = 168.201$ | | | |

What we claim is:

1. A wide angle zoom lens system which comprises a diverging lens group and a converging lens group in the order from the object side and in which both of said groups are movable on the optic axis of the lens system to vary the air space between said two groups so that the magnification of the image is variable while the image plane is being maintained at a fixed position, said diverging lens group comprising, in the order from the object side, a first member which is a negative meniscus lens component convex to the object side, a second member which is a negative meniscus lens component convex to the object side, and a third member which is a positive meniscus lens component convex to the object side, said converging lens group comprising at least four positive lens components which are separate from one another, a positive lens component being closest to the object side and a positive lens component being closest to the image side and a negative lens component disposed among said at least four positive lens components.

2. A wide angle zoom lens system according to claim 1, wherein said diverging lens group satisfies the following condition:

$$0.1 < \frac{D}{|f_1|} < 0.25,$$

where $f_1$ represents the total focal length of said diverging lens group, and D the air space between said second member and said third member.

3. A wide angle zoom lens system according to claim 2, wherein said diverging lens group further satisfies the following conditions:

$$|f_1| < |f_{11}| < 2|f_1|,$$

$$|f_1| < |f_{12}| < 2|f_1|,$$

$$1.5|f_1| < |f_{13}| < 3.0|f_1| \text{ and}$$

$$1.0 < \frac{R_3 + R_4}{R_3 - R_4} < \frac{R_1 + R_2}{R_1 - R_2} < \left|\frac{R_5 + R_6}{R_5 - R_6}\right|,$$

where $f_{11}$, $f_{12}$ and $f_{13}$ respectively represent the focal lengths of said first, second and third members in said deverging lens group, and $R_1$, $R_2$; $R_3$, $R_4$; $R_5$, $R_6$ respectively represent the curvature radii of the successive refracting surfaces in order from the object side.

4. A wide angle zoom lens system according to claim 3, wherein the respective components of said diverging lens group satisfy the following conditions:

$$3.3 < \frac{R_1 + R_2}{R_1 - R_2} < 4.2,$$

$$1.5 < \frac{R_3 + R_4}{R_3 - R_4} < 2.3 \text{ and}$$

$$-8.0 < \frac{R_5 + R_6}{R_5 - R_6} < -4.8,$$

where $R_1, R_2, \ldots, R_6$ respectively represent the curvature radii of the successive refracting surfaces, in order from the object side, of said lens components in said diverging lens group.

5. A wide angle zoom lens system according to claim 4, wherein said converging lens group comprises five components, namely, in order from the object side, a fourth member which is a positive lens component, a fifth member which is a positive lens component, a sixth member which is a positive meniscus lens component convex to the object side, a seventh member which is a negative lens component, and an eighth member which is a positive lens component.

6. A wide angle zoom lens system according to claim 5, having the following numerical data:
Total focal length: 36.023-49.497-68.795
F-number: 3.5
Maximum angle of view: 61.8°
Back focal distance: 43.286-52.587-65.909
focal length of divergent group: $f_1 = -59.942$
focal length of convergent group: $f_2 = 41.379$

| | | | |
|---|---|---|---|
| $f_1$ | $R_1 = 46.411$ | $d_1 = 1.5$ | $n_1 = 1.71300$ $\nu_1 = 53.9$ |
| | $R_2 = 25.766$ | $d_2 = 6.1$ | |
| | $R_3 = 136.271$ | $d_3 = 2.3$ | $n_2 = 1.69680$ $\nu_2 = 55.6$ |
| | $R_4 = 37.166$ | $d_4 = 8.3$ | |
| | $R_5 = 34.764$ | $d_5 = 3.8$ | $n_3 = 1.80518$ $\nu_3 = 25.5$ |
| | $R_6 = 51.636$ | $d_6 = 33.561 - 14.818 - 0.761$ | |
| $f_2$ | $R_7 = 86.016$ | $d_7 = 3.1$ | $n_4 = 1.46450$ $\nu_4 = 65.8$ |
| | $R_8 = -426.543$ | $d_8 = 0.1$ | |
| | $R_9 = 32.028$ | $d_9 = 5.3$ | $n_5 = 1.52000$ $\nu_5 = 70.1$ |
| | $R_{10} = -365.381$ | $d_{10} = 0.1$ | |
| | $R_{11} = 20.985$ | $d_{11} = 5.8$ | $n_6 = 1.52000$ $\nu_6 = 70.1$ |
| | $R_{12} = 54.800$ | $d_{12} = 4.0$ | |
| | $R_{13} = -229.491$ | $d_{13} = 1.5$ | $n_7 = 1.80518$ $\nu_7 = 25.5$ |
| | $R_{14} = 18.432$ | $d_{14} = 4.5$ | |
| | $R_{15} = 103.230$ | $d_{15} = 3.6$ | $n_8 = 1.67270$ $\nu_8 = 32.2$ |
| | $R_{16} = -40.525$ | | | where R, d, n and νd respectively represent the curvature radii of the refractive surfaces, the center thickness of and the air spaces between the respective lens components, the refractive indices for d-line (wavelength λ=587.6 nm), and the Abbe numbers for d-line (wavelength λ=587.6 nm).

7. A wide angle zoom lens system according to claim 4, wherein said converging lens group comprises five components, namely, in order from the object side, a fourth member which is a positive lens component, a fifth member which is a positive meniscus lens component convex to the object side, a sixth member which is a negative lens component, a seventh member which is a positive meniscus lens component convex to the image side, and an eighth member which is a positive lens component.

8. A wide angle zoom lens system according to claim 7, having the following numerical data:
Total focal length: 36.023-49.497-68.795
F-number: 3.5
Maximum angle of view: 61.8°
Back focal distance: 42.763-52.064-65.385
focal length of divergent group: $f_1 = -59.942$
focal length of convergent group: $f_2 = 41.379$

| | | | |
|---|---|---|---|
| | $R_1 = 43.640$ | $d_1 = 1.5$ | $n_1 = 1.71300$ $\nu_1 = 53.9$ |
| | $R_2 = 25.862$ | $d_2 = 4.9$ | |
| | $R_3 = 97.646$ | $d_3 = 2.3$ | $n_2 = 1.69680$ $\nu_2 = 55.6$ |
| $f_1$ | $R_4 = 34.089$ | $d_4 = 10.7$ | |
| | $R_5 = 32.807$ | $d_5 = 3.8$ | $n_3 = 1.80518$ $\nu_3 = 25.5$ |
| | $R_6 = 43.313$ | $d_6 = 32.854 - 14.110 - 0.054$ | |
| | $R_7 = 38.800$ | $d_7 = 8.6$ | $n_4 = 1.62041$ $\nu_4 = 60.3$ |
| | $R_8 = -118.771$ | $d_8 = 2.5$ | |
| | $R_9 = 21.150$ | $d_9 = 4.9$ | $n_5 = 1.62041$ $\nu_5 = 60.3$ |
| | $R_{10} = 67.565$ | $d_{10} = 2.7$ | |
| | $R_{11} = -111.186$ | $d_{11} = 4.2$ | $n_6 = 1.80518$ $\nu_6 = 25.5$ |
| $f_2$ | $R_{12} = 20.265$ | $d_{12} = 3.0$ | |
| | $R_{13} = -100.634$ | $d_{13} = 3.2$ | $n_7 = 1.62588$ $\nu_7 = 35.6$ |
| | $R_{14} = -29.367$ | $d_{14} = 0.1$ | |
| | $R_{15} = 50.024$ | $d_{15} = 2.5$ | $n_8 = 1.62588$ $\nu_8 = 35.6$ |
| | $R_{16} = 110.281$ | | | where R, d, n and νd respectively represent the curvature radii of the refractive surfaces, the center thickness of and the air space between the respective lens components, the refractive indices for d-line (wavelength λ=587.6 nm), and the Abbe numbers for d-line (wavelength λ=587.6 nm).

9. A wide angle zoom lens system according to claim 4, wherein said converging lens group comprises six components, namely, in order from the object side, a fourth member which is a positive lens component, a fifth member which is a positive lens component, a sixth member which is a positive meniscus lens component convex to the object side, a seventh member which is a negative lens component, an eighth member which is a positive meniscus lens component convex to the image side, and a ninth member which is a positive lens component.

10. A wide angle zoom lens system according to claim 9, having the following numerical data:
Total focal length: 36.023-49.497-68.795
F-number: 3.5
Maximum angle of view: 61.8°
Back focal distance: 42.981-52.283-65.604
focal length of divergent group: $f_1 = -59.942$
focal length of convergent group: $f_2 = 41.379$

| | | | |
|---|---|---|---|
| | $R_1 = 43.524$ | $d_1 = 1.5$ | $n_1 = 1.71300$ $\nu_1 = 53.9$ |
| | $R_2 = 26.068$ | $d_2 = 4.9$ | |
| $f_1$ | $R_3 = 98.490$ | $d_3 = 2.3$ | $n_2 = 1.69680$ $\nu_2 = 55.6$ |
| | $R_4 = 34.319$ | $d_4 = 11.4$ | |
| | $R_5 = 33.114$ | $d_5 = 3.8$ | $n_3 = 1.80518$ $\nu_3 = 25.5$ |
| | $R_6 = 43.047$ | $d_6 = 32.883 - 14.140 - 0.083$ | |
| | $R_7 = 38.412$ | $d_7 = 5.0$ | $n_4 = 1.62041$ $\nu_4 = 60.3$ |
| | $R_8 = -273.441$ | $d_8 = 0.1$ | |
| | $R_9 = 301.136$ | $d_9 = 2.4$ | $n_5 = 1.62041$ $\nu_5 = 60.3$ |
| | $R_{10} = -777.160$ | $d_{10} = 2.5$ | |
| | $R_{11} = 20.877$ | $d_{11} = 5.6$ | $n_6 = 1.62041$ $\nu_6 = 60.3$ |
| $f_2$ | $R_{12} = 53.182$ | $d_{12} = 3.0$ | |
| | $R_{13} = -125.912$ | $d_{13} = 2.5$ | $n_7 = 1.80518$ $\nu_7 = 25.5$ |
| | $R_{14} = 20.055$ | $d_{14} = 2.9$ | |
| | $R_{15} = -157.736$ | $d_{15} = 3.3$ | $n_8 = 1.62588$ $\nu_8 = 35.6$ |

-continued

| | | | |
|---|---|---|---|
| $R_{16} = -31.259$ | $d_{16} = 0.1$ | | |
| $R_{17} = 58.587$ | $d_{17} = 2.5$ | $n_9 = 1.62588$ | $\nu_9 = 35.6$ |
| $R_{18} = 168.201$ | | | | where R, d, n and $\nu$d respectively represent the curvature radii of the refractive surfaces, the center thickness of and the air spaces between the respective lens components, the refractive indices for d-line (wavelength $\lambda = 587.6$ nm), and the Abbe numbers for d-line (wavelength $\lambda = 587.6$ nm).

11. A wide angle zoom lens system according to claim 1, wherein said diverging lens group consists of said three lens components.

12. A wide angle zoom lens system according to claim 1, wherein said all lens components are spherical lenses.

* * * * *